US008708307B2

(12) United States Patent
Inglis

(10) Patent No.: US 8,708,307 B2
(45) Date of Patent: Apr. 29, 2014

(54) ELONGATED TRUNNION FOR HIGH PRESSURE BALL VALVES

(71) Applicant: Halliburton Energy Services, Inc., Houston, TX (US)

(72) Inventor: Peter Derek Walter Inglis, Dundee (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/892,885

(22) Filed: May 13, 2013

(65) Prior Publication Data
US 2013/0306898 A1 Nov. 21, 2013

Related U.S. Application Data

(63) Continuation of application No. PCT/IB2012/000984, filed on May 18, 2012.

(51) Int. Cl.
*F16K 5/06* (2006.01)
*E21B 33/00* (2006.01)
*E21B 34/00* (2006.01)
*E21B 43/00* (2006.01)

(52) U.S. Cl.
USPC ................................ 251/315.08; 166/332.3

(58) Field of Classification Search
CPC ... E21B 2034/002; F16K 5/06; F16K 27/067; F16K 5/0605; F16K 5/0689; F16K 5/20; F16K 5/204; F16K 5/205; F16K 5/208; F16K 5/068; F16K 11/08736
USPC ........ 251/315.08, 315.09, 315.01; 166/332.3, 166/334.2
See application file for complete search history.

(56) References Cited

U.S. PATENT DOCUMENTS

| 4,260,021 | A | | 4/1981 | Mott | |
|---|---|---|---|---|---|
| 4,293,038 | A | | 10/1981 | Evans | |
| 4,566,672 | A | * | 1/1986 | Giebeler | 251/192 |
| 4,634,098 | A | * | 1/1987 | Varden | 251/188 |
| 5,338,001 | A | * | 8/1994 | Godfrey et al. | 251/58 |
| 5,551,665 | A | * | 9/1996 | Noack et al. | 251/58 |
| 5,865,246 | A | | 2/1999 | Brown | |
| 6,662,886 | B2 | | 12/2003 | Russell | |
| 7,681,865 | B2 | * | 3/2010 | Furnival | 251/315.14 |
| 2004/0129913 | A1 | * | 7/2004 | Leonard et al. | 251/315.01 |
| 2007/0278438 | A1 | * | 12/2007 | Scott et al. | 251/172 |
| 2010/0084138 | A1 | * | 4/2010 | Inglis | 166/373 |
| 2011/0049408 | A1 | * | 3/2011 | Gutmann et al. | 251/315.08 |

OTHER PUBLICATIONS

Foreign communication from the priority application—International Search Report and Written Opinion, PCT/IB2012/000984, Feb. 26, 2013, 9 pages.

* cited by examiner

*Primary Examiner* — John K Fristoe, Jr.
*Assistant Examiner* — Michael R Reid
(74) *Attorney, Agent, or Firm* — Scott Wendorf; Conley Rose, P.C.

(57) ABSTRACT

A ball valve comprises a ball rotatably disposed within a housing, and a trunnion plate supporting the ball. The trunnion plate comprises a trunnion plate hole, and a trunnion plate shoulder disposed on a surface of the trunnion plate about the trunnion plate hole, where the trunnion plate shoulder has a length in the axial direction of the ball valve that is greater than a width in the radial direction of the ball valve.

20 Claims, 4 Drawing Sheets

ELONGATED TRUNNION FOR HIGH PRESSURE BALL VALVES

CROSS-REFERENCE TO RELATED APPLICATIONS

This application is a continuation of and claims priority to PCT International Application No. PCT/IB2012/000984, filed May 18, 2012 and entitled "Elongated Trunnion for High Pressure Ball Valves," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations containing hydrocarbons to allow recovery of the hydrocarbons. During the drilling and production of a hydrocarbon bearing formation, various procedures may be performed that involve temporarily isolating fluid flowing between the surface of a wellbore and the formation through a wellbore tubular. Such procedures can include flow control operations, completion operations, and/or interventions. Various valves, including ball valves, may be used during these procedures to control the flow of fluid through the wellbore tubular. When the ball valves are in the closed position, they can be used to isolate the flow of fluid through the valve. When the ball valves are in the open position, the valves may provide a fluid communication pathway through the valve as well as allowing tools and/or wellbore tubulars to be passed through the ball valve for use below the valve.

SUMMARY

In an embodiment, a ball valve comprises a ball rotatably disposed within a housing, and a trunnion plate supporting the ball. The trunnion plate comprises a trunnion plate hole, and a trunnion plate shoulder disposed on a surface of the trunnion plate about the trunnion plate hole, where the trunnion plate shoulder has a length in the axial direction of the ball valve that is greater than a width in the radial direction of the ball valve. The ball valve may also include an actuation member configured to actuate the ball between an open and closed position, and the actuation member may be configured to actuate the ball using a linear movement along the axial direction. The actuation member may comprise a plurality of arms, and a plurality of windows. Each of the plurality of windows may be disposed in a corresponding one of the plurality of arms, and the trunnion plate shoulder may extend into at least one of the windows. The ball may comprise a spigot, and the spigot may extend through the at least one of the windows and engages the trunnion plate shoulder. A ratio of an inner diameter of an interior flow passage of the ball to an outer diameter of the ball valve may be greater than about 0.35. The length in the axial direction may be at least about 10% greater than the width in the radial direction of the ball valve. The length in the axial direction of the ball valve may be at least about 10% of a diameter of the trunnion plate hole. A ratio of the length in the axial direction to the width in the radial direction may be between about 1.05:1 and 20:1. The trunnion plate shoulder may have an elongated shape comprising two sides in the axial direction having semi-circular cross-sections and two sides in the radial direction having parallel sides that are aligned with the axial direction. The trunnion plate shoulder may have a rectangular shape comprising two sides in the axial direction having sides that are parallel and perpendicular to the axial direction and two sides in the radial direction having parallel sides that are aligned with the axial direction. The trunnion plate shoulder may have a diamond-like shape comprising two triangular sides in the axial direction. The trunnion plate shoulder may have an elliptical shape comprising rounded sides in the axial directions that intersect at the radial edge of the trunnion plate hole.

In an embodiment, a ball valve comprises a ball comprising a plurality of spigots, and a plurality of trunnion plates. Each trunnion plate supports one of the plurality of spigots, and the trunnion plates are each configured to resist a greater load applied through the spigots in an axial direction than a radial direction. The plurality of trunnion plates may each comprise a trunnion plate hole configured to receive the one of the plurality of spigots. The ball valve may also include a bearing disposed within the trunnion plate hole and configured to receive the one of the plurality of spigots.

In an embodiment, a method comprises applying a load to a ball within a ball valve, where the ball valve is in a closed position, and where the ball valve comprises a trunnion plate supporting the ball, and retaining the ball in the closed position against the load using the trunnion plate. The trunnion plate comprises: a trunnion plate hole, and a trunnion plate shoulder disposed on a surface of the trunnion plate about the trunnion plate hole, where the trunnion plate shoulder has a length in the axial direction of the ball valve that is greater than a width in the radial direction of the ball valve. Applying the load to the ball may comprise establishing a pressure differential greater than about 1,000 psi across the ball when the ball valve is in the closed position. The ball valve may be a subsea safety valve, a subsurface safety valve, a lubricator valve, a retainer valve, a control valve, a fluid loss valve, or a barrier valve. The trunnion plate shoulder may be configured to resist a greater load without deforming than a comparative trunnion plate shoulder having a length in the axial direction of the ball valve that is about the same as or less than a width in the radial direction of the ball valve.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1:
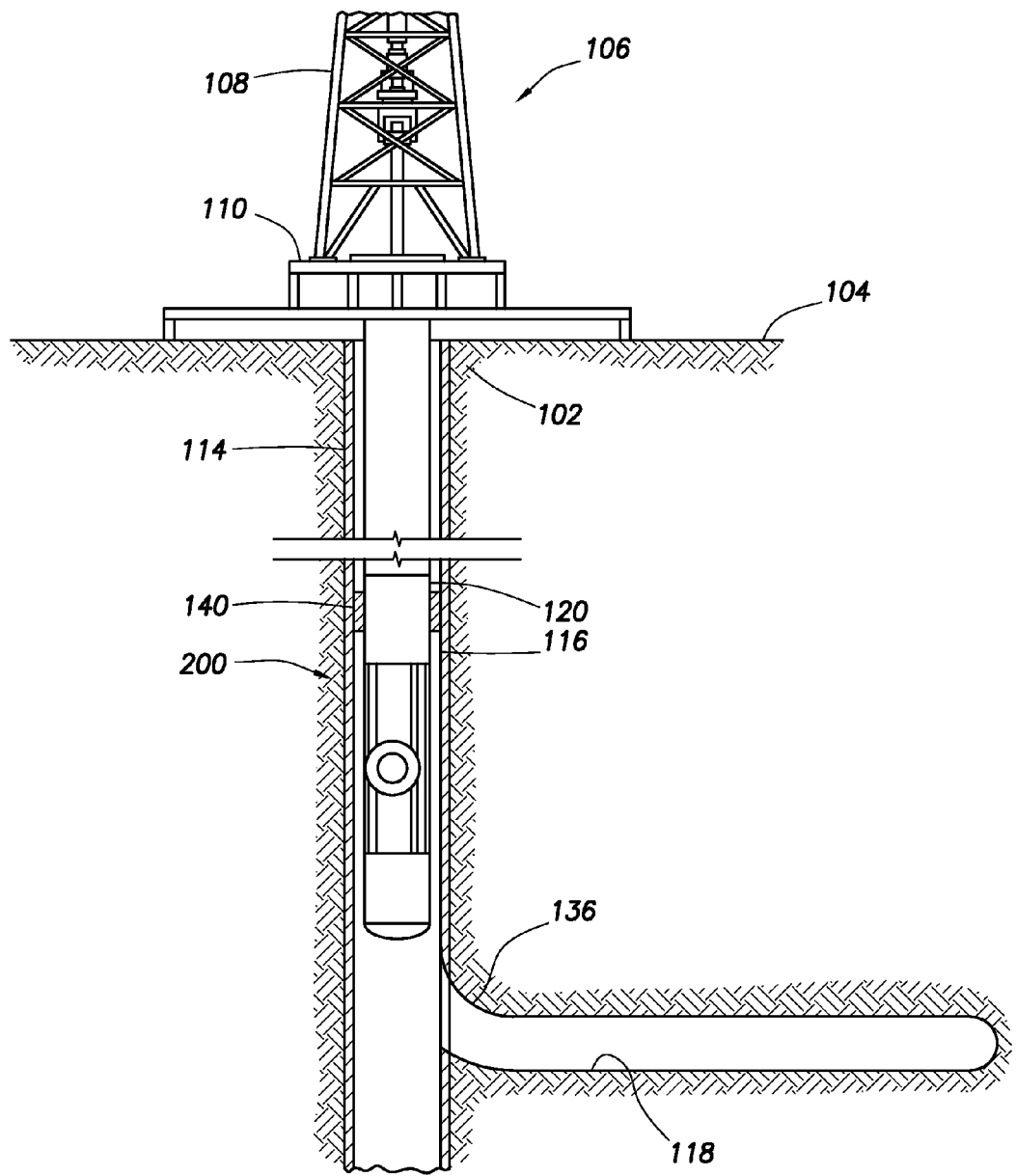
FIG. 1 is a schematic view of an embodiment of a subterranean formation and wellbore operating environment.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," "support" or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "above" meaning toward the surface of the wellbore and with "down," "lower," "downward," or "below" meaning toward the terminal end of the well, regardless of the wellbore orientation. Reference to in or out will be made for purposes of the description with "in," "inner," or "inward" meaning towards the central longitudinal axis of the ball valve, and with "out," "outer," or "outward" meaning away from the central longitudinal axis and towards the wellbore wall and/or outside surface of the ball valve. The various characteristics mentioned above, as well as other features and characteristics described in more detail below, will be readily apparent to those skilled in the art with the aid of this disclosure upon reading the following detailed description of the embodiments, and by referring to the accompanying drawings.

Referring to FIG. 1, an example of a wellbore operating environment in which a ball valve 200 may be used is shown. As depicted, the operating environment comprises a workover and/or drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, deviates from vertical relative to the earth's surface 104 over a deviated wellbore portion 136, and transitions to a horizontal wellbore portion 118. In alternative operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multi-lateral wellbore, and other types of wellbores for drilling and completing one or more production zones. Further the wellbore may be used for both producing wells and injection wells.

A wellbore tubular string 120 comprising a ball valve 200 may be lowered into the subterranean formation 102 for a variety of purposes (e.g., injecting or producing fluids from the wellbore, workover or treatment procedures, etc.) throughout the life of the wellbore 114. The embodiment shown in FIG. 1 illustrates the wellbore tubular 120 in the form of a production tubing string comprising a packer 140 disposed in the wellbore 114. It should be understood that the wellbore tubular 120 comprising the ball valve 200 is equally applicable to any type of wellbore tubular being inserted into a wellbore as part of a procedure needing fluid isolation from above or below the ball valve, including as non-limiting examples drill pipe, segmented pipe, casing, rod strings, and coiled tubing. Further, a means of isolating the interior of the wellbore tubular string 120 from the annular region between the wellbore tubular string 120 and the wellbore wall 114 may take various forms. For example, a zonal isolation device such as a packer (e.g., packer 140), may be used to isolate the interior of the wellbore tubular string 120 from the annular region to allow for the ball valve 200 to control the flow of a fluid through the wellbore tubular 120. In some embodiments, the wellbore tubular string 120 comprising the ball valve 200 may be used without any additional zonal isolation device (e.g., a packer).

The workover and/or drilling rig 106 may comprise a derrick 108 with a rig floor 110 through which the wellbore tubular 120 extends downward from the drilling rig 106 into the wellbore 114. The workover and/or drilling rig 106 may comprise a motor driven winch and other associated equipment for extending the wellbore tubular 120 into the wellbore 114 to position the wellbore tubular 120 at a selected depth. While the operating environment depicted in FIG. 1 refers to a stationary workover and/or drilling rig 106 for conveying the wellbore tubular 120 comprising the ball valve 200 within a land-based wellbore 114, in alternative embodiments, mobile workover rigs, wellbore servicing units (such as coiled tubing units), and the like may be used to lower the wellbore tubular 120 comprising the ball valve 200 into the wellbore 114. It should be understood that a wellbore tubular 120 comprising the ball valve 200 may alternatively be used in other operational environments, such as within an offshore wellbore operational environment.

Regardless of the type of operational environment in which the ball valve 200 is used, it will be appreciated that the ball valve 200 serves to control the flow of fluid from the surface of a wellbore to a formation (and vice-versa) through a tubular or conduit. As described in greater detail with reference to FIG. 2, the ball valve 200 comprises a ball 206 that can be disposed between two retaining members 202, 204 and an actuation member 208 that can actuate the ball 206 between an open and closed position and/or a closed and open position. The ball 206 engages and is supported by trunnion plates 230 that engage the spigots 212 disposed on the ball 206 in trunnion plate holes 232. The trunnion plate holes 232 may have additional structural components in the axial direction of the trunnion plates 230 to provide additional load bearing support to the ball 206 and prevent deformation of the trunnion plates 230 and/or the spigots 212. In order to accommodate the additional structural components, the trunnion plates 230 may be elongated relative to standard ball valve trunnion plates, and these trunnion plates 230 may be referred to as elongated trunnion plates 230. The ball valve 200 may also comprise components (e.g., a threaded connection) located above or below the ball valve 200 to allow the ball valve 200 to be disposed within and/or coupled to a wellbore tubular and/or other wellbore components (e.g., production subs, downhole tools, screens, etc.), for example to form a workstring, completion string, production string, conveyance string, etc. While the following discussion describes a wellbore tubular 120 with a ball valve 200, it should be understood that any plurality of ball valves 200 may be used in one or more wellbore tubular 120 strings to achieve the results and advantages described herein.

Figure 2:
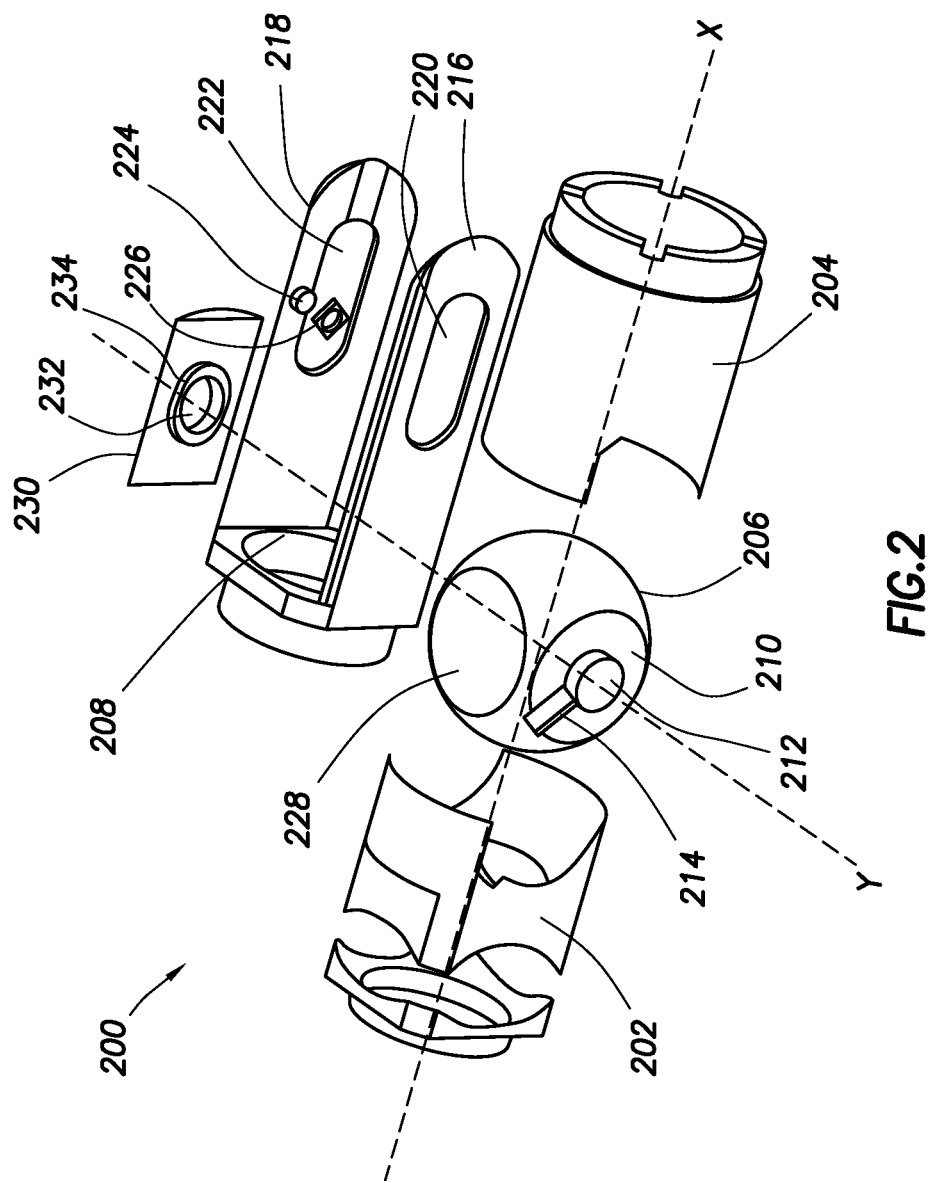
FIG. 2 is an isometric view of an embodiment of a ball valve.

As shown in FIG. 2, the ball valve 200 may generally comprise a variety of components to provide a seal (e.g., a ball/seat interface) and actuate the ball valve 200. While an exemplary ball valve assembly is described herein, it is expressly understood that the ball valve comprising the elongated trunnion described herein may be used in any ball valve and is not limited to the ball valve assembly described herein. The ball valve 200 assembly may comprise two cylindrical retaining members 202, 204 on opposite sides of the ball 206. One or more seats or seating surfaces may be disposed above and/or below the ball 206 (e.g., within or engaging cylindrical retaining member 202 and/or cylindrical retaining member 204) to provide a fluid seal with the ball 206. The ball 206 generally comprises a truncated sphere having planar surfaces 210 on opposite sides of the sphere. Planar surfaces 210 may each have a spigot 212 comprising a projection (e.g., cylindrical projections) extending outwardly therefrom, and a radial groove 214 extending from the spigots 212 to the edge of the planar surface 210.

An actuation member 208 having two parallel arms 216, 218 may be positioned about the ball 206 and the retaining members 202, 204. The actuation member 208 may be aligned such that arms 216, 218 are in a plane parallel to that of planar surfaces 210. Spigots 212 may be received in windows 220, 222 through each of the arms 216, 218. Actuation pins 224 may be provided on each of the inner sides of the arms 216, 218. Pins 224 may be received within the grooves 214 on the ball 206. Bearings 226 may be positioned between each pin 224 and groove 214. An elongated trunnion plate 230 may comprise a trunnion plate hole 232 configured to receive and engage a spigot 212 extending through the respective windows 220, 222 in the arms 216, 218. While only one trunnion plate 230 is illustrated in FIG. 2 and described below for clarity, it is to be understood that another trunnion plate would be disposed on the opposite side of the ball 206 to engage the second spigot. The trunnion plate hole 232 may generally comprise a cylindrical passage extending through the trunnion plate 230. While shown as having a circular cross section, the trunnion plate hole 232 may comprise any other suitable shape and an optional bearing (e.g., bearing 301 of FIG. 3) may be used to provide a generally cylindrical opening for receiving the spigot 212 of the ball 206. The trunnion plate hole 232 may comprise a trunnion plate shoulder 234 that comprises a protrusion from the inner surface of the trunnion plate 230 extending radially inwards towards the central axis of the ball valve 200. The trunnion plate shoulder 234 may allow the trunnion plate 230 to engage the spigot 212 over a larger surface area. In some embodiments, a bearing may be disposed between the spigots 212 and the respective trunnion plate holes 232.

In the open position, the ball 206 is positioned so as to allow the flow of fluid through the ball valve 200 by allowing fluid to flow through an interior fluid passageway 228 (e.g., a bore or hole) extending through the ball 206. During operation, the ball 206 is rotated about rotational axis Y such that interior flow passage 228 is rotated out of alignment with the flow of fluid, thereby forming a fluid seal with one or more seats or seating surfaces and closing the valve. The interior flow passage 228 may have its longitudinal axis disposed at about 90 degrees to the axis X when the ball is in the closed position and the longitudinal axis may be aligned with the axis X when the ball is in the open position. The ball 206 may be rotated by linear movement of the actuation member 208 along axis X. The pins 224 move as the actuation member 208 moves, which causes the ball 206 to rotate due to the positioning of the pins 224 within the grooves 214 on the ball 206. The actuation member may translate within the limits of the spigots 212 and/or the trunnion plate shoulders 234, which may be configured to engage the ends of the windows 220, 222 in the arms 216, 218 at the full open and/or full closed positions.

During actuation of the ball valve 200, the trunnion plates 230 maintain the position of the ball 206 within the ball valve 200. The actuation member 208 then moves relative to the trunnion plates 230, thereby rotating the ball 206. Thus, the trunnion plates 230 support the ball 206 during actuation and when the ball 206 is in the open and closed positions. In the closed position, the fluid seal formed between the one or more seats or seating surfaces and the ball 206 may result in the ball 206 retaining a pressure differential across the ball valve 200. The pressure differential may provide a load to the ball 206, which may act in the upward or downward direction depending on the direction of the pressure differential and/or the location of the one or more seats or seating surfaces. The load may be transferred through the spigots 212 to the trunnion plates 230 due to the engagement of the spigots 212 in the trunnion plate holes 232. The trunnion plates 230 may then transfer the load to the valve body 200. In a high pressure application (e.g., greater than about 1,000 psi, greater than about 5,000 psi, or greater than about 10,000 psi), the load on the ball 206 may result in deformation of the various components of the ball valve 200 including the spigots 212 and/or in the area of the trunnion plate holes 232. This deformation may result in a misalignment of the ball 206 relative to the one or more seals when actuated to the open position. Continued deformation and cycling of the ball valve 200 may lead to an unreliable seal through the ball valve 200.

Figure 3A:
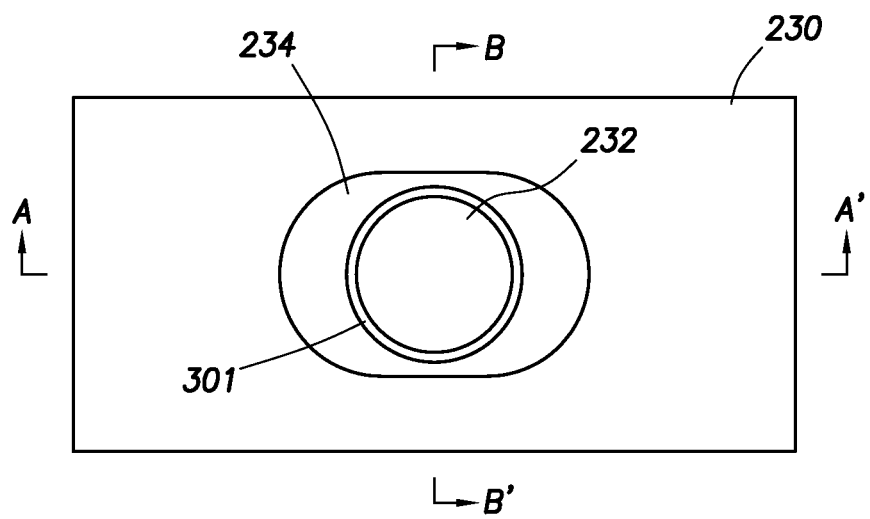
FIG. 3A illustrates a plan view of an embodiment of a trunnion plate.
Figure 3B:
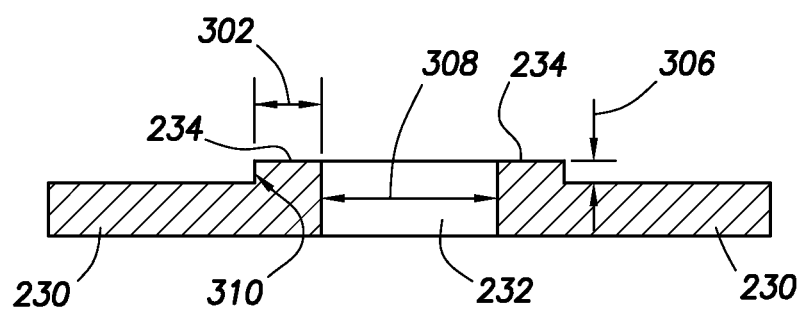
FIG. 3B illustrates a cross-sectional view of an embodiment of a trunnion plate along line A-A' of FIG. 3A.
Figure 3C:
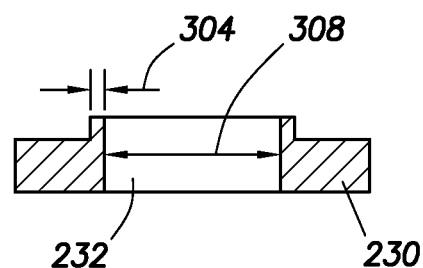
FIG. 3C illustrates a cross-sectional view of an embodiment of a trunnion plate along line B-B' of FIG. 3A.

As shown in FIGS. 3A-3C, the area of the trunnion plate hole 232 may be configured to resist deformation due to a load placed on the ball through the use of additional structural components in the axial direction of the trunnion plate 230, which may provide additional load bearing support to the ball and prevent deformation of the trunnion plate 230. In an embodiment, the trunnion plate may be configured to resist a greater load applied in an axial direction than a radial direction. As used herein, the axial direction is substantially aligned with the longitudinal axis of the ball valve 200 (e.g., along the X axis in FIG. 2). As used herein, the radial direction is generally normal to the axial direction and can include a rotational direction and a translation along a plane perpendicular to the longitudinal axis of the ball valve 200.

The trunnion plate shoulder 234 may be disposed about the trunnion plate hole 232 and extend outward from the trunnion plate hole 232 in both the axial and radial directions to form a lip around the trunnion plate hole 232 for receiving the spigot. The trunnion plate shoulder 234 may have a height 306 extending from the surface of the trunnion plate 230. The height 306 of the trunnion plate shoulder 234 may be selected to extend into the actuation mechanism (e.g., into windows 220, 222 in the arms 216, 218 of FIG. 2) and engage a surface of the actuation mechanism. Based on the increased axial length of the trunnion plate shoulder as described herein, the windows (e.g., windows 220, 222 of FIG. 2) in the actuation member may be lengthened by a corresponding amount to allow the actuation member to actuate the ball valve between a fully closed position and a fully opened position, or a fully opened position and a fully closed position. The edge 310 of the trunnion plate shoulder 234 furthest from the trunnion plate hole 232 may form a shoulder with the surface of the trunnion plate 230. The shoulder may be configured to engage a surface of the actuation mechanism and may therefore be substantially perpendicular to the surface of the trunnion plate 230. In some embodiments, the edge 310 of the trunnion plate shoulder 234 may be beveled, angled, rounded, or otherwise sloped with respect to the trunnion plate 230.

A cross-section along line A-A' of FIG. 3A is illustrated in FIG. 3B. As illustrated, the trunnion plate shoulder 234 may have an axial length 302 extending in the axial direction from the trunnion plate hole 232, which has a diameter 308. A cross-section along line B-B' of FIG. 3A is illustrated in FIG. 3C. As illustrated, the trunnion plate shoulder 234 may have a radial width 304 extending in the radial direction from the trunnion plate hole 232. In an embodiment, the trunnion plate shoulder 234 may be configured to resist deformation by having additional material in the axial direction of the trunnion plate 230 relative to the radial direction. As illustrated, the trunnion plate shoulder 234 may have additional material in both the upwards and downwards axial directions. In this embodiment, the axial length 302 of the trunnion plate shoulder 234 may be greater than the radial width 304 of the trunnion plate shoulder 234. In an embodiment, the axial length 302 of the trunnion plate shoulder 234 may be at least about 10%, at least about 20%, at least about 30%, at least about 40%, or at least about 50% greater than the radial width 304 of the trunnion plate shoulder 234. In an embodiment the axial length 302 of the trunnion plate shoulder 234 may be at least about 10%, at least about 20%, at least about 30%, or at least about 40% of the diameter 308 of the trunnion plate hole 232, and in this embodiment, the radial width 304 of the trunnion plate shoulder 234 may be less than about 30%, about 20%, about 10%, or about 5% of the diameter 308 of the trunnion plate hole 232. In an embodiment, the ratio of the axial length 302 of the trunnion plate shoulder to the radial width 304 of the trunnion plate shoulder may be greater than 1:1 and may range from about 1.01:1 to about 20:1.

Ball valves may be configured to resist the higher loads by increasing the diameter 308 of the trunnion plate hole 232. However, this may result in either an increase in the outer diameter of the ball valve or a reduction in the diameter of the inner diameter of the interior flow passage 228, which is the available inner diameter of the ball valve through which another wellbore tubular can be passed and/or through which fluids can be produced. By increasing the length of the trunnion plate shoulder 234 in the axial direction, the ball valve may be able to support a load on the ball without deformation while allowing for a decreased outer diameter or increased inner diameter of the interior flow passage 228. This effect may be characterized by the ratio of the inner diameter of the interior flow passage 228 to the outer diameter of the ball valve 200. In an embodiment, the ratio of the inner diameter of the interior flow passage 228 to the outer diameter of the ball valve 200 may be greater than a corresponding ratio of a ball valve have a comparative trunnion plate shoulder with a length in the axial direction of the ball valve that is about the same as or less than a width in the radial direction of the ball valve. In an embodiment, the ratio of the inner diameter of the interior flow passage 228 to the outer diameter of the ball valve 200 may be greater than about 0.35, greater than about 0.37, greater than about 0.40, greater than about 0.42, greater than about 0.44, greater than about 0.46, greater than about 0.48, greater than about 0.50, greater than about 0.52, greater than about 0.54, greater than about 0.56, greater than about 0.58, or greater than about 0.60, greater than about 0.62, greater than about 0.64, greater than about 0.66, greater than about 0.68, or greater than about 0.70.

The shape of the trunnion plate shoulder 234 may vary while providing additional material in the axial direction. As illustrated in FIG. 3A, the trunnion plate shoulder 234 may have an elongated shape comprising two sides in the axial direction having semi-circular cross-sections and two sides in the radial direction having generally parallel sides that are generally aligned with the axial direction of the trunnion plate 230. In this configuration, the trunnion plate shoulder has an overall oblong cross section about the trunnion plate hole 232. The portions of the trunnion plate shoulder 234 extending in the axial direction may have a greater axial length than the radial width of the trunnion plate shoulder 234 due to the semi-circular cross sections. The use of semi-circular sides may allow the trunnion plate to be used with an actuation member having windows with corresponding semi-circular ends. Further, the generally parallel sides of the trunnion plate shoulder 234 may be received within the windows and engage the corresponding generally parallel sides of the windows to allow the trunnion plate shoulder to translate within the windows.

Figure 4A:
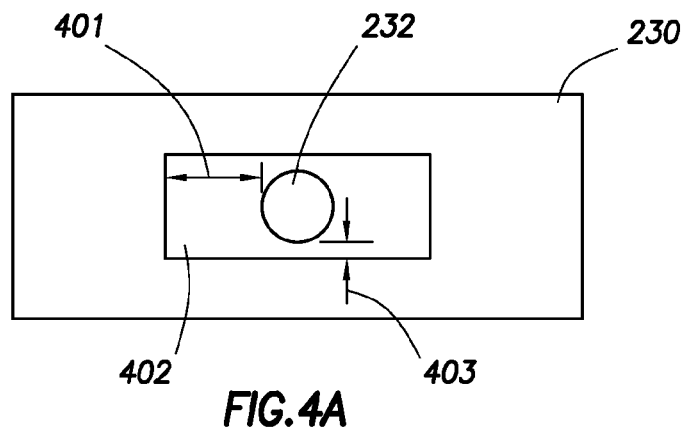
FIGS. 4A-4C illustrate plan views of various embodiments of a trunnion plate.

The trunnion plate shoulder may also comprise other shapes. As illustrated in FIG. 4A, the trunnion plate shoulder 402 may have a generally rectangular shape comprising two sides in the axial direction having sides that are generally parallel and perpendicular to the axial direction, and two sides in the radial direction having generally parallel sides that are generally aligned with the axial direction of the trunnion plate 230. In this configuration, the trunnion plate shoulder has an overall rectangular cross section about the trunnion plate hole 232. The portions of the trunnion plate shoulder 402 extending in the axial direction may have a greater axial length 401 than the radial width 403 of the trunnion plate shoulder 402. The use of flat and generally parallel surfaces on the axial ends of the trunnion plate shoulder 402 may allow the trunnion plate 230 to be used with an actuation member having a generally rectangular window with corresponding flat ends. Further, the generally parallel sides of the trunnion plate shoulder 402 may be received within the window and engage the corresponding generally parallel sides of the window to allow the trunnion plate shoulder to translate within the window.

Figure 4B:
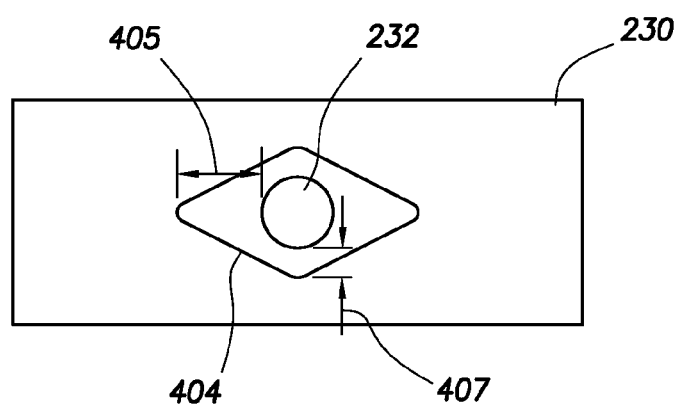

Another embodiment of a trunnion plate shoulder 404 is illustrated in FIG. 4B. In this embodiment, the trunnion plate shoulder 404 may have a generally diamond-like shape comprising generally triangular sides in the axial directions and sides that meet in a point or have small sections that are generally parallel and aligned with the axial direction of the trunnion plate 230. In this configuration, the trunnion plate shoulder has a generally overall diamond cross section about the trunnion plate hole 232. The portions of the trunnion plate shoulder 402 extending in the axial direction may have a greater axial length 405 than the radial width 407 of the trunnion plate shoulder 402. The use of triangular shaped sides on the axial ends of the trunnion plate shoulder 404 may allow the trunnion plate 230 to be used with an actuation member having a window with corresponding triangular ends.

Figure 4C:
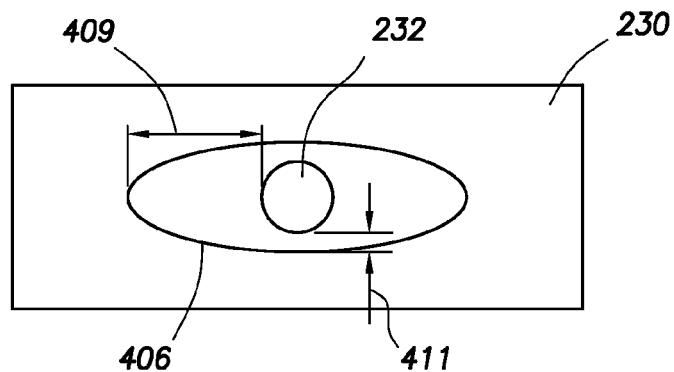

Still another embodiment of a trunnion plate shoulder 406 is illustrated in FIG. 4C. In this embodiment, the trunnion plate shoulder 406 may have a generally elliptical or oval shape comprising generally rounded sides in the axial directions that meet along the radial edge of the trunnion plate hole 232. The portions of the trunnion plate shoulder 406 extending in the axial direction may have a greater axial length 409 than the radial width 411 of the trunnion plate shoulder 406. The use of rounded sides on the axial ends of the trunnion plate shoulder 406 may allow the trunnion plate 230 to be used with an actuation member having a window with corresponding rounded ends.

While various embodiments of the trunnion plate shoulder have been described, it will be appreciated that the selection of the geometry of the trunnion plate shoulder and/or the trunnion plate (e.g., the axial length of the trunnion plate shoulder, the radial width of the trunnion plate shoulder, the height of the trunnion plate shoulder, the length and/or width of the trunnion plate, and/or the diameter of the trunnion plate hole) may be selected based on a number of factors. In an embodiment, the geometry of the trunnion plate shoulder and/or the trunnion plate may be based on a number of factors including, but not limited to, the expected pressure differential across the ball 206, the size of the ball 206, the composition of the components of the ball valve 200, the properties of the spigots 212, and/or the desired shape of the trunnion plate shoulder and or the windows 220, 222 in the actuation member 208. Further, the geometry of the trunnion plate 230 and/or the trunnion plate shoulder 234 may be the same for each trunnion plate 230 and/or trunnion plate shoulder 234 on either side of the ball 206. Alternatively, the geometry for each trunnion plate 230 and/or trunnion plate shoulder 234 may be different.

Referring to FIGS. 1 and 2, the ball valve 200 comprising the trunnion plate 230 described herein may be used to control the flow of a fluid in a subterranean wellbore 114. In an embodiment, a ball valve 200 may be provided and disposed within the wellbore 114 in a subterranean formation 102. The ball valve 200 may form a part of a wellbore tubular string 120 and may be conveyed into and/or out of the wellbore 114 as part of the wellbore tubular string 120. The ball valve 200 may be used with any types of valves including, but not limited to, subsea safety valves, subsurface safety valves, lubricator valves, retainer valves, control valves, fluid loss valves, barrier valves, and the like. Additional wellbore components such as one or more zonal isolation devices 140 may be used in conjunction with the ball valve 200 to control the flow of a fluid within the wellbore 114. In some embodiments, one or more ball valves 200 comprising the trunnion plates 230 with the trunnion plate shoulder 234 as described herein may be used with a wellbore tubular string 120 to control the flow of fluids within various zones of wellbore 114. The use of the ball valve 200 may allow for control of the flow of a fluid into or out of the wellbore.

Once disposed in the wellbore, the ball valve 200 may be disposed in a closed position. A pressure differential may be applied across the ball 206 resulting in a load being applied to the ball 206. The load may be transferred through the spigots 212 of the ball 206 to the trunnion plate 230. The load may generally be applied in an axial direction so that the load is directed through the spigots 212 to the trunnion plate holes 232 in the axial direction. Due to the increased axial length of the trunnion plate shoulder 234, the trunnion plate shoulder 234 may resist deformation from the applied load. In an embodiment, the trunnion plate shoulder 234 may resist deformation under a load that would otherwise deform a trunnion plate 230 without the trunnion plate shoulder and/or a trunnion plate shoulder having an axial length about the same as or less than the radial width of the trunnion plate shoulder. Deformation of the spigots 212 may occur when the trunnion plate and/or the trunnion plate shoulder 234 yields under the applied load. The spigots 212 may then deform beyond their elastic limit and permanently deform. Based on the resistance to deformation of the trunnion plate shoulder 234, the spigots 212 may be retained in position and/or be retained to a degree sufficient to prevent yielding of the spigots beyond their elastic limit.

The use of the trunnion plate shoulder described herein may reduce and/or prevent the degree of deformation of the spigots and/or the trunnion plate in a ball valve. This may allow the ball valve to demonstrate improved performance in terms of maintaining a consistent seal throughout the life of the ball valve. This in turn may reduce the cost and time associated with replacing a ball valve in a wellbore application. Further, the use of the trunnion plate shoulders on the trunnion plate may allow for a ball have a smaller outer diameter and a larger inner diameter, thereby allow for a larger wellbore tubular to be passed through the ball valve when in the open position.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A ball valve comprising:
    a ball rotatably disposed within a housing; and
    a trunnion plate supporting the ball, wherein the trunnion plate comprises:
        a trunnion plate hole, and
        a trunnion plate shoulder disposed on a surface of the trunnion plate about the trunnion plate hole, wherein the trunnion plate shoulder comprises an inward protrusion from an inner surface of the trunnion plate, wherein the inward protrusion extends towards a central longitudinal axis of the ball valve, wherein the inward protrusion protrudes from a flat innermost surface of the trunnion plate, and wherein the trunnion plate shoulder has a length in the axial direction of the ball valve that is greater than a width in the radial direction of the ball valve.

2. The ball valve of claim 1, further comprising an actuation member configured to actuate the ball between an open and closed position.

3. The ball valve of claim 2, wherein the actuation member is configured to actuate the ball using a linear movement along the axial direction.

4. The ball valve of claim 3, wherein the actuation member comprises:
a plurality of arms, and
a plurality of windows, wherein each of the plurality of windows is disposed in a corresponding one of the plurality of arms, wherein the trunnion plate shoulder extends into at least one of the windows.

5. The ball valve of claim 4, wherein the ball comprises a spigot, and wherein the spigot extends through the at least one of the windows and engages the trunnion plate shoulder.

6. The ball valve of claim 1, wherein a ratio of an inner diameter of an interior flow passage of the ball to an outer diameter of the ball valve is greater than about 0.35.

7. The ball valve of claim 1, wherein the length in the axial direction is at least about 10% greater than the width in the radial direction of the ball valve.

8. The ball valve of claim 1, wherein the length in the axial direction of the ball valve is at least about 10% of a diameter of the trunnion plate hole.

9. The ball valve of claim 1, wherein a ratio of the length in the axial direction to the width in the radial direction is between about 1.05:1 and 20:1.

10. The ball valve of claim 1, wherein the trunnion plate shoulder has an elongated shape comprising two sides in the axial direction having semi-circular cross-sections and two sides in the radial direction having parallel sides that are aligned with the axial direction.

11. The ball valve of claim 1, wherein the trunnion plate shoulder has a rectangular shape comprising two sides in the axial direction having sides that are parallel and perpendicular to the axial direction and two sides in the radial direction having parallel sides that are aligned with the axial direction.

12. The ball valve of claim 1, wherein the trunnion plate shoulder has a diamond-like shape comprising two triangular sides in the axial direction.

13. The ball valve of claim 1, wherein the trunnion plate shoulder has an elliptical shape comprising rounded sides in the axial directions that intersect at the radial edge of the trunnion plate hole.

14. The ball valve of claim 1, wherein the ball comprises a plurality of spigots; and further comprising:
a plurality of trunnion plates, wherein each trunnion plate supports one of the plurality of spigots, wherein the trunnion plates are each configured to resist a greater load applied through the spigots in an axial direction than a radial direction.

15. The ball valve of claim 14, wherein the plurality of trunnion plates each comprise a trunnion plate hole configured to receive the one of the plurality of spigots.

16. The ball valve of claim 15, further comprising a bearing disposed within the trunnion plate hole and configured to receive the one of the plurality of spigots.

17. A method comprising:
applying a load to a ball within a ball valve, wherein the ball valve is in a closed position, and wherein the ball valve comprises a trunnion plate supporting the ball, wherein the trunnion plate comprises:
a trunnion plate hole, and
a trunnion plate shoulder disposed on a surface of the trunnion plate about the trunnion plate hole, wherein the trunnion plate shoulder comprises an inward protrusion from an inner surface of the trunnion plate, wherein the inward protrusion extends towards a central longitudinal axis of the ball valve, wherein the inward protrusion protrudes from a flat innermost surface of the trunnion plate, and wherein the trunnion plate shoulder has a length in the axial direction of the ball valve that is greater than a width in the radial direction of the ball valve; and
retaining the ball in the closed position against the load using the trunnion plate.

18. The method of claim 17, wherein applying the load to the ball comprises establishing a pressure differential greater than about 1,000 psi across the ball when the ball valve is in the closed position.

19. The method of claim 17, wherein the ball valve is a subsea safety valve, a subsurface safety valve, a lubricator valve, a retainer valve, a control valve, a fluid loss valve, or a barrier valve.

20. The method of claim 17, wherein the trunnion plate shoulder is configured to resist a greater load without deforming than a comparative trunnion plate comprising a comparative trunnion plate hole and a comparative trunnion plate shoulder having a length in the axial direction of the ball valve that is about the same as or less than a width in the radial direction of the ball valve.

* * * * *